US00RE48872E

(19) United States
(12) Reissued Patent
Magerkurth et al.

(10) Patent Number: US RE48,872 E
(45) Date of Reissued Patent: Jan. 4, 2022

(54) HYDRODYNAMIC TORQUE CONVERTER

(71) Applicant: Schaeffler Technologies AG & Co. KG, Herzogenaurach (DE)

(72) Inventors: Heiko Magerkurth, Freiburg im Breisgau (DE); Christian Huegel, Rheinau (DE); Andreas Meissner, Karlsruhe (DE)

(73) Assignee: Schaeffler Technologies AG & Co. KG, Herzogenaurach (DE)

(21) Appl. No.: 15/704,477

(22) Filed: Sep. 14, 2017

Related U.S. Patent Documents

Reissue of:
(64) Patent No.: 8,573,374
Issued: Nov. 5, 2013
Appl. No.: 13/000,076
PCT Filed: Jun. 12, 2009
PCT No.: PCT/DE2009/000819
§ 371 (c)(1),
(2) Date: Dec. 20, 2010
PCT Pub. No.: WO2010/000220
PCT Pub. Date: Jan. 7, 2010

(30) Foreign Application Priority Data

Jul. 4, 2008 (DE) ..... 10 2008 031 431.5
Aug. 14, 2008 (DE) ..... 10 2008 037 808.9

(51) Int. Cl.
*F16H 45/02* (2006.01)
*F16F 15/14* (2006.01)

(52) U.S. Cl.
CPC ..... *F16H 45/02* (2013.01); *F16F 15/145* (2013.01)

(58) Field of Classification Search
CPC ..... F16F 15/145; F16H 45/02; F16H 2045/0226; F16H 2045/0263
(Continued)

(56) References Cited

U.S. PATENT DOCUMENTS 3,800,931 A 4/1974 Maucher
4,844,216 A * 7/1989 Fukushima ..... 192/3.26
(Continued)

FOREIGN PATENT DOCUMENTS

DE 196 04 160 C1 5/1997
DE 196 18 864 A1 11/1997
(Continued)

OTHER PUBLICATIONS

IPR2017-00441—Petition for Inter Partes Review of Claims 1-16 of U.S. Pat. No. 8,573,374 Under 35 U.S.C. § 312 and 37 C.F.R. § 42.104, 99 pages, filed Dec. 7, 2016.
(Continued)

*Primary Examiner* — Russell D Stormer
(74) *Attorney, Agent, or Firm* — Venable LLP

(57) ABSTRACT

The invention relates to a hydrodynamic torque converter having an impeller wheel, a turbine wheel and an oscillation damper which is accommodated in the converter housing, and a converter lockup clutch. Two damper stages are arranged here as a serial damper between the output hub of the torque converter and the converter lockup clutch, and a damper stage is arranged between the turbine wheel and the output hub. In order to improve the damping properties, a rotary oscillation absorber is additionally provided which is arranged between the dampers and is also connected to the turbine wheel in a rotationally fixed fashion.

33 Claims, 1 Drawing Sheet

(58) Field of Classification Search
USPC ..... 192/3.28, 3.29
See application file for complete search history.

(56) References Cited

U.S. PATENT DOCUMENTS

| | | | | |
|---|---|---|---|---|
| 5,080,215 | A | 1/1992 | Forster et al. | |
| 5,295,411 | A | 3/1994 | Speckhart | |
| 5,388,678 | A * | 2/1995 | Murata | F16H 45/02 192/3.29 |
| 5,884,735 | A | 3/1999 | Eckel et al. | |
| 6,026,940 | A * | 2/2000 | Sudau | 192/3.28 |
| 6,053,292 | A | 4/2000 | MacDonald | |
| 6,244,401 | B1 | 6/2001 | Maienschein et al. | |
| 7,073,646 | B2 | 7/2006 | Sasse et al. | |
| 8,042,667 | B2 * | 10/2011 | Degler | F16H 45/02 192/213.2 |
| 8,047,345 | B2 * | 11/2011 | Degler | F16H 45/02 192/212 |
| 8,161,739 | B2 | 4/2012 | Degler et al. | |
| 8,161,740 | B2 * | 4/2012 | Krause et al. | 60/338 |
| 2004/0226794 | A1 * | 11/2004 | Sasse et al. | 192/3.29 |
| 2005/0039998 | A1 | 2/2005 | Zuehl et al. | |
| 2006/0201765 | A1 | 9/2006 | Arhab | |
| 2007/0181395 | A1 * | 8/2007 | Mueller et al. | 192/3.29 |
| 2007/0205067 | A1 | 9/2007 | Frey et al. | |
| 2007/0235277 | A1 * | 10/2007 | Heuler | F16D 25/0638 192/3.3 |
| 2007/0284206 | A1 | 12/2007 | Davis | |
| 2008/0121483 | A1 | 5/2008 | Sasse et al. | |
| 2009/0125202 | A1 * | 5/2009 | Swank et al. | 701/68 |
| 2010/0236228 | A1 | 9/2010 | Degler et al. | |
| 2010/0242466 | A1 | 9/2010 | Krause et al. | |
| 2011/0179782 | A1 | 7/2011 | Huegel et al. | |

FOREIGN PATENT DOCUMENTS

| | | | |
|---|---|---|---|
| DE | 196 54 894 | A1 | 12/1997 |
| DE | 196 54 915 | A1 | 2/1998 |
| DE | 19804227 | | 8/1999 |
| DE | 199 14 871 | A1 | 10/2000 |
| DE | 102 36 752 | A1 | 2/2004 |
| DE | 10358901 | | 2/2005 |
| DE | 102006028556 | | 1/2007 |
| DE | 102008057647 | | 6/2009 |
| DE | 102008057648 | | 6/2009 |
| DE | 102009021355 | | 12/2009 |
| EP | 0200634 | | 11/1986 |
| EP | 1 582 766 | A2 | 10/2005 |
| EP | 1744074 | | 1/2007 |
| GB | 2 231 123 | B | 3/1993 |
| GB | 2271411 | A1 | 4/1994 |
| JP | H 09264399 | | 10/1997 |
| JP | H 11311309 | | 11/1999 |
| WO | WO 2004018897 | | 3/2004 |
| WO | 2009067988 | | 6/2009 |
| WO | WO 2009/067987 | A1 | 6/2009 |
| WO | WO 2009067988 | | 6/2009 |
| WO | WO 2009/146673 | A1 | 12/2009 |

OTHER PUBLICATIONS

IPR2017-00441—Petitioner Exhibit 1002 filed Dec. 7, 2016, Declaration of Dr. Steven Shaw, 152 pages.
IPR2017-00441—Petitioner Exhibit 1007 filed Dec. 7, 2016, Declaration of Jochen Sties, 5 pages.
IPR2017-00441—Patent Owner's Preliminary Response, 50 pages, filed Apr. 4, 2017.
IPR2017-00441—Decision Institution of Inter Partes Review 37 C.F.R. § 42.108(a), 21 pages, Jun. 23, 2017.
IPR2017-00441—Patent Owner's Request for Adverse Judgment Pursuant to 37 C.F.R. § 42.73(B), 4 pages, filed Sep. 15, 2017.
IPR2017-00442—Petition for Inter Partes Review of Claims 1, 3-5, 8, 10, and 14-16 of U.S. Pat. No. 8,573,374 Under 35 U.S.C. § 312 and 37 C.F.R. § 42.104, 48 pages, filed Dec. 7, 2016.
IPR2017-00442—Petitioner Exhibit 1102 filed Dec. 7, 2016, Declaration of Dr. Steven Shaw, 80 pages, filed Dec. 7, 2016.
IPR2017-00442—Petitioner Exhibit 1105 filed Dec. 7, 2016, Wolfgang Reik, The Centrifugal Pendulum Absorber Calming Down the Drivetrain, CTI Symposium, May 2009.
IPR2017-00442—Petitioner Exhibit 1107 filed Dec. 7, 2016, Declaration of Pascal Hervet.
IPR2017-00442—Petitioner Exhibit 1115 filed Dec. 7, 2016, Wolfgang Reik, The Centrifugal Pendulum Absorber Calming Down the Drivetrain, CTI Symposium, Dec. 2008.
IPR2017-00442—Patent Owner's Preliminary Response, 23 pages, filed Apr. 4, 2017.
IPR2017-00442—Petitioner Exhibit 1116 filed May 1, 2017, Transcript of telephone between Petitioner's counsel, Patent Owner's counsel and the Patent Trial and Appeal Board judges on Apr. 19, 2017, 18 pages.
IPR2017-00442—Petitioner Reply to Patent Owner Preliminary Response, 6 pages, filed Apr. 26, 2017.
IPR2017-00442—Patent Owner's Sur-Reply, 7 pages, filed May 2, 2017.
IPR2017-00442—Decision Denying Institution of Inter Partes Review 37 C.F.R. § 42.108(a), Jun. 26, 2017.
Japanese Wikipedia document of Jan. 19, 2015 (see computer translation "Dynamic vibration absorber," Wikipedia, obtained Sep. 26, 2017).

* cited by examiner

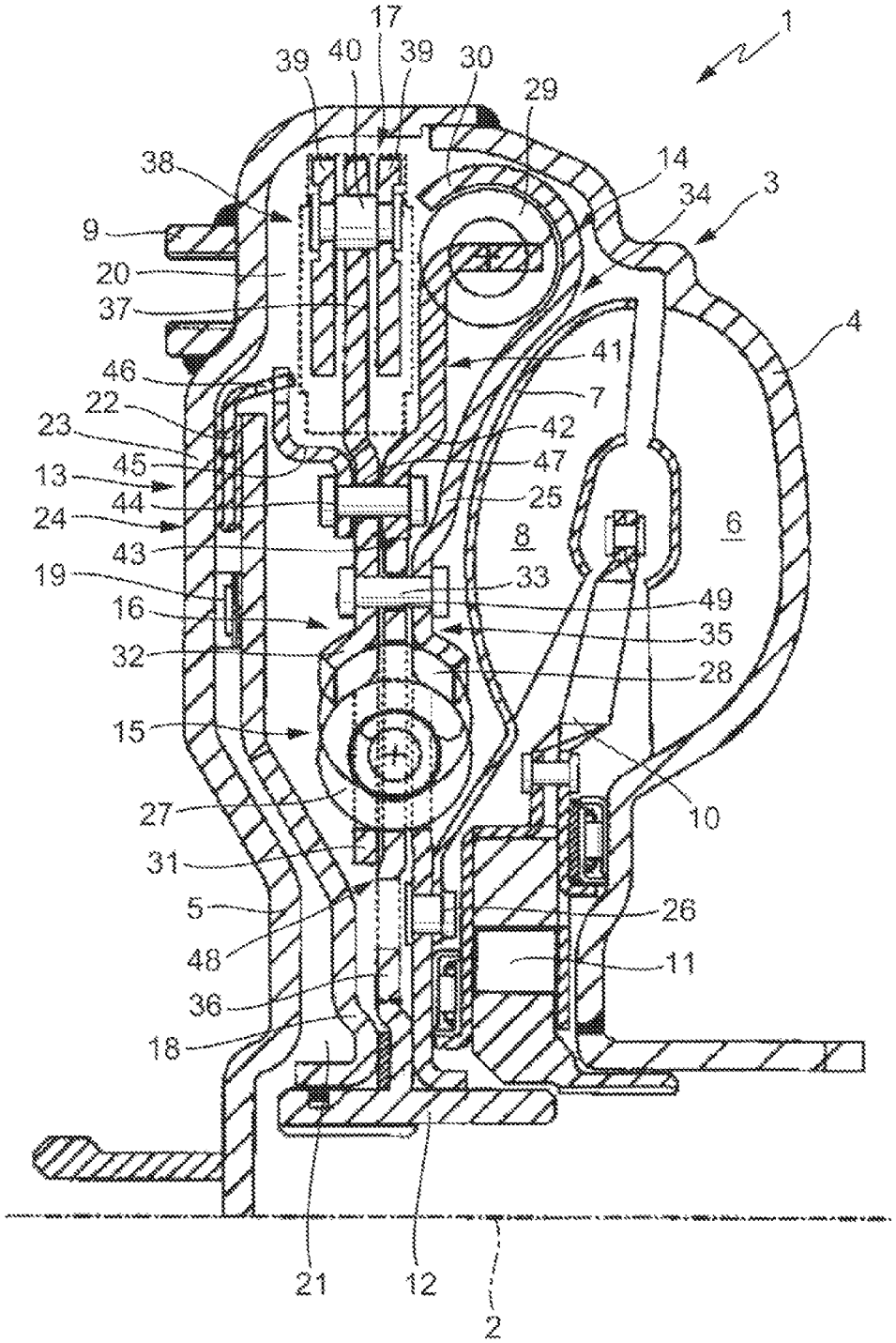
1
17
39
40
39
30
29
38
14
34
3
9
20
37
4
41
46
7
22
42
23
45
47
13
44
25
24
8
6
43
19
33
49
16
35
32
28
15
10
27
31
5
26
48
11
36
18
21
12
2

HYDRODYNAMIC TORQUE CONVERTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 8,573,374, issued Nov. 5, 2013, which is hereby incorporated by reference herein. U.S. Pat. No. 8,573,374 was issued from U.S. application Ser. No. 13/000,076, which* is the National Stage of PCT International Application No. PCT/DE2009/000819, filed Jun. 12, 2009, which application published in German and is hereby incorporated by reference in its entirety, which application claims priority from German Patent Application No. DE 10 2008 031 431.5, filed Jul. 4, 2008 and from German Patent Application No. DE 10 2008 037 808.9, filed Aug. 14, 2008 which applications are incorporated by reference in their entirety.

FIELD OF THE INVENTION

The invention relates to a hydrodynamic torque converter with a lock-up clutch and a multistage torsional vibration damper.

BACKGROUND OF THE INVENTION

Such torque converters are particularly used in vehicle drive trains, between an internal combustion engine and transmission. To damp torsional vibrations of an internal combustion engine, the so-called torsional vibration dampers are used, which are driven via an input part, whereby the torque is transmitted to an output part that is relatively and limitedly rotatable with respect to said part, and through compression of energy accumulators, the energy is temporarily stored at torque peaks and released to the output part at torque troughs. The torque converter is configured by means of a damping device, a so-called conventional damper between the lock-up clutch and the output hub of the torque converter so that when the lock-up clutch is closed, torsional vibrations are damped via the torque path between converter housing and output hub. Furthermore, the so-called turbine dampers are known which by open or missing lock-up clutch, after initial hydraulic damping between impeller and turbine, still damp the remaining torsional vibrations and as such are disposed between the turbine and output hub. Furthermore, combinations of both damper types are known.

Another form of reducing torsional vibrations is the absorber principle by which movable masses are disposed on mounting parts to counteract the effect of energy accumulators or in the case of centrifugal force pendulums, absorber masses are disposed tiltably on raceways extending in circumferential- and radially direction and hence the inertial moment of the mounting part is varied depending on vibration influences.

Just as more restrictive assembly space specifications in motor vehicles, especially in transverse drive units comprising internal combustion engine and transmission as well as the torque converter disposed in between, also the assembly space requirement for the embodiment of torque converters increases if sufficient vibration damping is sought. Task of the invention is therefore further development of a torque converter with little assembly space but sufficient vibration damping.

BRIEF SUMMARY OF THE INVENTION

The task is solved by means of a hydrodynamic torque converter with a turbine driven by an impeller as well as housing in which a torsional vibration damper with multiple damper stages and a torsional vibration absorber and a lockup clutch are additionally mounted, whereby two damper stages are disposed in series between the lock-up clutch and an output hub, the torsional vibration absorber between the damper stages, and a damper stage between the turbine and output hub, whereby the torsional vibration absorber is connected non-rotatably with the turbine. Through the proposed disposition, a torsional vibration absorber, for instance a centrifugal force pendulum, can be provided with both damper stages, so that the damper stages in overall can be designed for a smaller assembly space. A further advantage is the partition of the torsional vibration dampers in at least two damper stages, whereby the torsional vibration damper exercises two functions, namely that of a series damper and the other of a turbine damper. Through integration of both damper stages in a single damper that concurrently features a torsional vibration absorber assigned to both damper stages, multiple components can be shared, so that in overall, for a given assembly space and damping capacity, a lighter and narrower torque converter can be proposed. For torque increase, particularly at a low speed range, a stator with one way clutch can be disposed moreover non-rotatably fixed in housing between impeller and turbine.

The common inventive concept comprises a multiple number of additional measures that can be combined or used individually in order to obtain a narrower assembly space. For instance, an input part of the first damper stage and an output part of the second damper stage can be centered on one another, so that, on the same axial assembly space, an input part and an output part can be mounted. Both components are thereby supported rotatably relative to one another. For instance, an output part of the second damper stage can be disposed radially within the first damper stage.

Furthermore, several components of different damper stages with respect to their function can be formed as one piece. For instance, at least a disk part can be formed as one piece out of an in input- and an output part of two damper stages. For example, an output part of a radial, outer damper stage can at the same time form a centrifugal force support, in that the disk part is guided accordingly radially outside, at least partially around the energy accumulators. Window cutouts for receiving the energy accumulators can be provided radially inside. Furthermore, such a formed disk part can form the turbine hub or the turbine shell can at least be mounted on said disk part, for instance riveted. This disk part can be mounted rotatably radially inside, on the output hub, so that with a flange part of the output hub by interposition of energy accumulators acting in circumferential direction, the second damper stage can be formed as turbine damper.

The torsional vibration absorber is preferably formed as a centrifugal force pendulum, whereby a mounting part accommodating absorber masses distributed over the circumference of the torsional vibration absorber and a disk part of the input part of a damper stage can be formed as one piece. Thereby, a two-part input part, for instance, of the second damper stage can be formed of two axially spaced disk parts, whereby the first disk part concurrently entails the mounting part and the second disk part is formed as one piece with the output part of the first damper stage. The disk part not containing the mounting part is connected non-rotatably, for linking the torsional vibration absorber to the first damper stage, with the other disk part by means of fastening means like rivets.

To minimize axial assembly space, components can be disposed axially over-lapping, in that they are radially disposed where the other component features a radial slit or design. For instance, absorber masses of the torsional vibration absorber and energy accumulators of the first damper stage disposed over the circumference can be disposed at the same height radially and axially spaced from one another, whereby a middle mounting diameter of the energy accumulators is disposed radially outside the turbine. In this manner, the energy accumulators can at least partially axially overlap the turbine, for instance, on its torus tapering on the external circumference.

Furthermore, the energy accumulators can be distributed over the circumference of the second damper stage, based on a middle mounting diameter, radially within the turbine blades. The energy accumulators of the second damper stage can thereby particularly through the torus form of the turbines be brought so close to the turbine shell so that radial outer areas of the turbines and the axial edge areas of the energy accumulators intersect axially. Altogether, the torsional vibration damper can therefore be brought close to the turbine, so that the end of the torsional vibration damper towards the lock-up clutch is essentially flat and the lock-up clutch can be closer to the torsional vibration damper.

For further reduction of the axial assembly space, the lock-up clutch in closed state can be disposed axially in a fastening means provided radially within the outside part of the torque converter mounted in a pocket formed on the housing wall. In this manner, the torque converter can be disposed closely on a flex plate or a drive plate, whereby a radially disposed constriction, about the rotation axis, of the converter housing can provide axial assembly space for the crankshaft with a mounting for the flex plate.

The lock-up clutch furthermore can be disposed radially within the absorber masses. To increase the capacity of the torque capable of being transmitted by such reduced friction diameter, the lock-up clutch can be equipped with a friction plate that is pressurized by a piston centered on the output hub and that is axially displaceable on the housing and non-rotatably mounted axially opposite the converter housing forming a frictional closure.

The mounting part for absorber masses can be disposed axially between the lock-up clutch and the first damper stage. For the transmission of torque from the lock-up clutch to the first damper stage are [transition] *transmission* connections provided between the lock-up clutch and the input part of the first damper stage, which are guided through the mounting part. To allow rotational clearance between the fixed mounting part on output side and the input part of the first damper stage, the circular segment-shaped openings are provided in the mounting part. Moreover, the passage openings serve as limit stops and when rotary clearance is used up, they transmit torque further to the first damper stage and directly via transmission connections into the second damper stage.

BRIEF DESCRIPTION OF THE SEVERAL VIEWS OF THE DRAWING

The invention is illustrated in detail based on the exemplary embodiment shown in the only FIGURE. This FIGURE shows a hydrodynamic torque converter disposed about a rotation axis in a half-sectional view.

The FIGURE shows the hydrodynamic torque converter 1 in half-sectional view above the rotation axis 2. The housing 3 is formed out of the housing parts 4, 5, which are welded with one another after installation of internal parts. The impeller 6 is integrated inside the housing part 4, so that upon rotation of the housing 3 the turbine 7 with turbine blades 8 is driven by converter fluid inside the housing 3. The housing 3 is driven by an internal combustion engine—not depicted. For this purpose, fastening means 9 attached to the housing part 5, for instance welded with a rigid drive- or flex plate preferably axially elastic but rigid in circumferential direction, are rigidly connected with the crankshaft of the internal combustion engine, with the housing 3 after joining the torque converter mounted on the transmission and rigidly connected e.g. screwed with the internal combustion engine. A stator 10 is connected e.g. splined between an impeller 6 and turbine 7 via one-way clutch 11 with a transmission stub—not depicted.

The output part of the torque converter 1 is formed by the output hub 12, which is connected e.g. splined non-rotatably with a transmission input shaft—not depicted. A lock-up clutch 13 is mounted inside the housing 3, which in the closed state transmits the torque from the internal combustion engine to the housing 3 via the damper stages 14, 15 into the output hub 12. When the lock-up clutch 13 is open, torque flows via the impeller 6 to the turbine and from there via the damper stage 15 into the output hub 12. For a slipping lockup clutch 13 partial torque can be transmitted via both torque paths.

The lock-up clutch 13 is formed by a piston 18 rotatably mounted on the output hub 12, axially displaceable and sealed, which is connected non-rotatably with the housing by means of leaf springs 19. By adjusting a differential pressure between the two chambers 20, 21, piston 18 adjusts an axial force between itself and a housing wall 23, so that a frictional lock forms on the interposed friction plate 22 and the friction surfaces of the piston 18 and housing wall 23. The housing wall 23 is formed as an annular pocket 24 in which the piston 18 and the friction plate 22 are fully received axially when the lock-up clutch 13 is closed. Through formation of the lock-up clutch 13 with a two-sided friction plate, the latter can for the same torque capable of being transmitted be mounted on a diameter that radially lies within the fastening means 9, so that an accommodation neutral to the assembly space of the lock-up clutch 13 is necessary with respect of the axial assembly. The fastening means 9 can therefore be displaced axially towards the transmission for a specified radial diameter through tapering of the housing part 5, so that the connection to the flex plate can occur by reducing an axial distance apart.

The torsional vibration damper 16 with the damper stages 14, 15 is designed as a multi-function damper. The two damper stages 14, 15 are connected with one another by a single-piece disk part 25 assigned to the damper stages 14, 15, which is centered rotatably radially inside on the output hub 12. Radially outside is the turbine shell of the turbine 7 connected with the disk part 25 by fastening means 26 e.g. rivets. Radially outside the fastening means 26, for instance, the energy accumulators 27, of the damper stage 15, formed as coil springs distributed over the circumference, are mounted in window-shaped recesses 28, which support the energy accumulators through correspondingly formed-parts against the centrifugal force effect. On the external circumference of the disk part 25 are energy accumulators 29 of the damper stage 14 mounted and supported against centrifugal force. For this, the disk part 25 features formed-parts 30, which surround the energy accumulators 29 radially. The disk part 25 thereby forms the complete output part 34 of the damper stage 14, whereas the disk part 25 in the damper stage 15 forms a part of the input parts 35, which is completed by a second disk part 31 with corresponding window-shaped recesses 32. The two disk parts 25, 31 are axially spaced relative to one another by means of the rivets 33 and rigidly connected and accommodate the flange part 36, which is rigidly connected e.g. welded or formed as one piece with the output hub 12. To ensure the rotating ability of the flange part 36, acting as output part 48 of both damper stages 14, 15, with respect to the input part 35 of the damper stage 15, circular segment shaped cutouts 49 are provided in the flange part 36, whereby after consumption of the rotational clearance the rivets 33 strike on the cutouts and the torque from the output part 34 of the damper stage 14 is transmitted to the flange part 36 and from there to the output hub 12.

In radial extension, the disk part 31 in a single-piece manner forms the mounting part 37 of the torsional vibration absorber 17, which, through this design, forms a centrifugal force pendulum 38, in that on both sides of the mounting part 37 absorber masses 39 spaced axially apart are distributed over the circumference, which are connected with one another by means of rivets 40 and are guided in circumferential direction and in radially extending raceways—not visible in detail. Between the rivets 40 and the raceways, a bearing such as plain or roller bearing can be provided. Through the single-piece connection of the mounting part 37 with the input part 35 of the damper stage 15 and the output part 34 of the damper stage 15 by means of the rivets 33 is the centrifugal force pendulum 38 assigned parallel to both damper stages.

The input part 41 of the damper stage 14 is formed by a ring part 42, which is centered on a centering circumference 43 of the flange part 36 and is permanently connected by means of transmission connections 44 like rivets with a ring gear 45, which forms a tooth system with an external teeth 46 of the friction plate 22. During assembly of both housing parts 4, 5, the tooth system is formed between the friction plate preassembled in the housing part 5 and the ring gear 45 preassembled in the housing part 4.

To ensure that the mounting part 37 or disk parts 31 is rotatable, circular segment-shaped openings 47 are provided in said part, through which the transmission connections 44 are guided.

For further reduction of the axial assembly space are energy accumulators 29 disposed radially outside the turbine 7 and surround said turbine at least partially axially. The energy accumulators 27 are brought closer to the turbine 7 in the tapered area between turbine blades 8 and the fastening on the disk part 25. The carrier masses 39 are closely spaced axially to the energy accumulators 29 radially disposed outside the lock-up clutch 13.

The functioning manner of the torsional vibration damper 16 is differentiated in the state with actuated and non-actuated lock-up clutch 13. If this is opened then the damper stage 14 is out of operation because the input part 41 is essentially without load. The torque flows from the turbine 7 into the damper stage 15 via the input part 35 and the energy accumulators 27 into the output part 48 as flange part 36 and from there via the output hub 12 into the transmission input shaft.

When lock-up clutch 13 is actuated, the torque is introduced via the frictional plate 22, the gearing and the transmission connections 44 in the input part 41. The input part 41 pressurizes the energy accumulators 29, which can be arc springs, and said transmit the torque after consuming the rotary clearance of the cutouts 49 by means of limit stopped rivets 33, the torque to the common output part 48 acting as flange part 36 and from there via the output hub 12 on the transmission input shaft. The energy accumulators 27 are preferably designed with stiffness, such that the torque transmitted through said stiffness does not lead to consumption of the rotary clearance and torque peaks are damped through the elastic properties of the energy accumulators. Thereby, the centrifugal force pendulum 38 is active in a particularly advantageous manner, so that in the elastic operating range of both damper stages 14, 15, they are additionally active in vibration damping.

LIST OF REFERENCE SYMBOLS

1 hydrodynamic torque converter
2 rotation axis
3 housing
4 housing part
5 housing part
6 impeller
7 turbine
8 turbine blade
9 fastening means
10 stator
11 one way clutch
12 output hub
13 lock-up clutch
14 damper stage
15 damper stage
16 torsional vibration damper
17 torsional vibration absorber
18 piston
19 leaf spring
20 chamber
21 chamber
22 friction plate
23 housing wall
24 pocket
25 disk part
26 fastening means
27 energy accumulator
28 recess
29 energy accumulator
30 formed-part
31 disk part
32 recess
33 rivet
34 output part
35 input part
36 flange part
37 mounting part
38 centrifugal force pendulum
39 absorber mass
40 rivet
41 input part
42 ring part
43 centering circumference
44 transmission connection
45 ring gear
46 external teeth
47 opening
48 output part
49 cutout

What is claimed is:

[1. A hydrodynamic torque converter (1) with a turbine (7) driven by an impeller (6) as well as housing (3) in which a torsional vibration damper (16) with multiple of damper stages (14, 15), a torsional vibration absorber (17) and a lock-up clutch (13) are additionally installed, wherein a first damper stage (14) and a second damper stage (15) are disposed between the lock-up clutch (13) and an output hub (12), the second damper stage (15) is disposed between the turbine (7) and the output hub (12) and the torsional vibration absorber (17) is parallel to both damper stages (14, 15).]

[2. The hydrodynamic torque converter (1) according to claim 1, wherein an input part (41) of the first damper stage (14) and an output part (48) of the second damper stage (15) are centered on one another.]

[3. The hydrodynamic torque converter (1) according to claim 1, wherein a disk part (25) is allocated to two damper stages (14, 15) as one piece.]

[4. The hydrodynamic torque converter (1) according to claim 1, wherein the torsional vibration absorber (17) comprises a plurality of absorber masses (39), and a mounting part (37) of the torsional vibration absorber (17) forms a disk part (31) of an input part (35) of the second damper stage (15).]

[5. The hydrodynamic torque converter (1) according to claim 1, wherein absorber masses (39) of the torsional vibration absorber (17) and energy accumulators (29) of the first damper stage (14) disposed over the circumference are radially at the same height but axially spaced apart.]

[6. The hydrodynamic torque converter (1) according to claim 5, wherein a middle mounting diameter of the energy accumulators (29) is disposed radially outside the turbine (7).]

[7. The hydrodynamic torque converter (1) according to claim 5, wherein the energy accumulators (29) overlap the turbine (7) at least partially and axially.]

[8. The hydrodynamic torque converter (1) according to claim 1, wherein energy accumulators (27) are distributed over the circumference of the second damper stage (15) based on a middle mounting diameter radially within turbine blades (8) of the turbine (7).]

[9. The hydrodynamic torque converter (1) according to claim 8, wherein the energy accumulators (27) of the second damper stage (15) and the turbine (7) at least partially and axially overlap.]

[10. The hydrodynamic torque converter (1) according to claim 1, wherein the lock-up clutch (13) in a closed state is axially mounted in a pocket (24) formed in a housing wall (23) radially inward of fastening means (9) provided on external part of the torque converter (1).]

[11. The hydrodynamic torque converter (1) according to claim 10, wherein the lock-up clutch (13) is formed out of a piston (18) centered on the output hub (12) and mounted non-rotatably and axially displacably on the housing (3), and axially pressurizes a friction plate (22) that can be clamped between said piston and said housing (3) to develop a frictional engagement.]

[12. The hydrodynamic torque converter (1) according to claim 11, wherein a mounting part (37) of the torsional vibration absorber (17) is disposed axially between lock-up clutch (13) and the first damper stage (14).]

[13. The hydrodynamic torque converter (1) according to claim 12, wherein between the friction plate (22) and an input part (41) of the first damper stage (14) transition connections (44) are formed, which reach through circular segment-shaped openings (47) of the mounting part (37).]

[14. The hydrodynamic torque converter according to claim 1, wherein in the closed state of the lock-up clutch (13) the torsional vibration absorber (17) acts between both damper stages (14, 15).]

[15. The hydrodynamic torque converter according to claim 1, wherein the torsional vibration absorber (17) is connected non-rotatably with the turbine (7).]

[16. The hydrodynamic torque converter according to claim 15, wherein in the opened state of the lock-up clutch (13) the torsional vibration absorber (17) is connected non-rotatably with the turbine (7).]

*17. A hydrodynamic torque converter (1) with a turbine (7), driven by an impeller (6), as well as housing (3) in which a torsional vibration damper (16) with multiple damper stages (14, 15), a torsional vibration absorber (17) and a lock-up clutch (13) are additionally installed, wherein the torsional vibration absorber includes a centrifugal force pendulum, wherein a first damper stage (14) and a second damper stage (15) of the multiple damper stages are disposed between the lock-up clutch (13) and an output hub (12), the second damper stage (15) is disposed between the turbine (7) and the output hub (12) and the centrifugal force pendulum is connected to an interconnection between an output of the first damper stage and an input of the second damper stage so that the centrifugal force pendulum is parallel to both damper stages (14, 15), wherein the centrifugal force pendulum is connected non-rotatably relative to the turbine (7) and a disk part that forms the interconnection between the input part of the second damper stage and the output part of the first damper stage, wherein the centrifugal force pendulum comprises a plurality of absorber masses (39) and a mounting part (37), and wherein the mounting part forms part of the disk part with the input part (35) of the second damper stage (15).*

*18. The hydrodynamic torque converter (1) according to claim 17, wherein the disk part that connects the first and second damper stages (14, 15) is a single piece.*

*19. The hydrodynamic torque converter (1) according to claim 17, wherein the torsional vibration damper comprises energy accumulators (29) for the first damper stage (14), and the absorber masses and the energy accumulators are disposed over a circumference radially at a same height and axially spaced apart.*

*20. The hydrodynamic torque converter (1) according to claim 17, wherein the mounting part (37) of the centrifugal force pendulum is disposed axially between the lock-up clutch (13) and the first damper stage (14).*

*21. The hydrodynamic torque converter according to claim 17, wherein in a closed state of the lock-up clutch (13) torque flows through the first damper stage and the second damper stage such that the centrifugal force pendulum acts on both damper stages (14, 15), and wherein in an open state of the lockup clutch, torque flows through only the second damper stage such that the centrifugal force pendulum acts only on the second damper stage.*

*22. The hydrodynamic torque converter according to claim 17, wherein a further disk part connected to the disk part forms a mounting part of the centrifugal force pendulum.*

*23. The hydrodynamic torque converter according to claim 17, wherein the disk part forms at least an output of the first damper.*

*24. The hydrodynamic torque converter as recited in claim 17, wherein a limit stop for the second damper stage is provided on the disk part.*

*25. The hydrodynamic torque converter according to claim 17, further comprising a fastener fixing a portion of at*

*least one of the first damper stage and the second damper stage to the turbine, wherein the absorber masses are positioned radially outside of the fastener, and the second damper stage includes energy accumulators positioned radially outside of the fastener.*

*26. The hydrodynamic torque converter according to claim 17, wherein the multiple damper stages include energy accumulators, the absorber masses extending radially outside of the energy accumulators.*

*27. A hydrodynamic torque converter (1) with a turbine (7) driven by an impeller (6) as well as housing (3) in which a torsional vibration damper (16) with multiple of damper stages (14, 15), a torsional vibration absorber (17) and a lock-up clutch (13) are additionally installed, wherein the torsional vibration absorber is a centrifugal force pendulum, wherein a first damper stage (14) and a second damper stage (15) of the multiple damper stages are disposed between the lock-up clutch (13) and an output hub (12), the second damper stage (15) is disposed between the turbine (7) and the output hub (12) and the centrifugal force pendulum is connected to an interconnection between an output part of the first damper stage and an input part of the second damper stage so that the centrifugal force pendulum is parallel to both damper stages (14, 15), the centrifugal force pendulum is connected non-rotatably relative to the turbine (7) and a disk part that forms part of the interconnection between the output part of the first damper stage and an input part of the second damper stage, and wherein a mounting part (37) of the centrifugal force pendulum is disposed axially between the lock-up clutch (13) and the first damper stage (14).*

*28. The hydrodynamic torque converter according to claim 27, wherein the mounting part is connected to the disk part and a plurality of absorber masses movably mounted on the mounting part.*

*29. The hydrodynamic torque converter according to claim 28, wherein a further disk part forms the mounting part.*

*30. The hydrodynamic torque converter as recited in claim 29 wherein a limit stop for the first damper stage is provided on the further disk part.*

*31. The hydrodynamic torque converter according to claim 27, further comprising a fastener fixing a portion of at least one of the first damper stage and the second damper stage to the turbine, wherein the centrifugal force pendulum comprises masses positioned radially outside of the fastener, and the second damper stage includes energy accumulators positioned radially outside of the fastener.*

*32. The hydrodynamic torque converter according to claim 27, wherein the centrifugal force pendulum includes masses and the multiple damper stages include energy accumulators, the masses extending radially outside of the energy accumulators.*

*33. The hydrodynamic torque converter according to claim 27, wherein a further disk part forms the mounting part of the centrifugal force pendulum, and the disk part and the further disk part together form the input part of the second damper stage.*

*34. The hydrodynamic torque converter according to claim 27, wherein the mounting part of the centrifugal force pendulum forms a single piece with the disk part (31).*

*35. The hydrodynamic torque converter according to claim 27, wherein the disk part forms an output part of the first damper stage, a further disk part forms the mounting part of the centrifugal force pendulum, and the disk part and the further disk part together form an input part of the second damper stage.*

*36. The hydrodynamic torque converter according to claim 27, wherein the disk part is a unitary structure.*

*37. A hydrodynamic torque converter (1) with a turbine (7) driven by an impeller (6) as well as housing (3) in which a torsional vibration damper (16) with multiple of damper stages (14, 15), a torsional vibration absorber (17) and a lock-up clutch (13) are additionally installed, wherein the torsional vibration absorber is a centrifugal force pendulum, wherein a first damper stage (14) and a second damper stage (15) of the multiple damper stages are disposed between the lock-up clutch (13) and an output hub (12), the second damper stage (15) is disposed between the turbine (7) and the output hub (12) and the centrifugal force pendulum is connected to an interconnection between an output of the first damper stage and an input of the second damper stage so that the centrifugal force pendulum is parallel to both damper stages (14, 15), wherein in a closed state of the lock-up clutch (13) torque flows through the first damper stage and the second damper stage such that the centrifugal force pendulum acts on both damper stages (14, 15), and wherein in an open state of the lockup clutch, torque flows through only the second damper stage such that the centrifugal force pendulum acts only on the second damper stage.*

*38. The hydrodynamic torque converter according to claim 37, wherein the torsional vibration damper includes a unitary disk part that forms the interconnection between the first damper stage and the second damper stage, and wherein the centrifugal force pendulum includes a mounting part connected to the disk part and a plurality of absorber masses movably mounted on the mounting part.*

*39. The hydrodynamic torque converter according to claim 38, wherein a further disk part forms the mounting part.*

*40. The hydrodynamic torque converter according to claim 38, further comprising a fastener fixing a portion of the first damper stage to the turbine, wherein the plurality of absorber masses are positioned radially outside of the fastener, and the second damper stage includes energy accumulators positioned radially outside of the fastener.*

*41. The hydrodynamic torque converter according to claim 38, wherein the multiple damper stages include energy accumulators, the absorber masses extending radially outside of the energy accumulators.*

*42. The hydrodynamic torque converter according to claim 41, wherein the disk part forms an output part of the first damper stage.*

*43. The hydrodynamic torque converter according to claim 38, wherein the mounting part comprises a further disk part, and the disk part and the further disk part together form the input part of the second damper stage.*

*44. A hydrodynamic torque converter (1) with a turbine (7) driven by an impeller (6) as well as housing (3) in which a torsional vibration damper (16) with multiple of damper stages (14, 15), a torsional vibration absorber (17) and a lock-up clutch (13) are additionally installed, wherein the torsional vibration absorber is a centrifugal force pendulum, wherein a first damper stage (14) and a second damper stage (15) of the multiple damper stages are disposed between the lock-up clutch (13) and an output hub (12), the second damper stage (15) is disposed between the turbine (7) and the output hub (12) and the centrifugal force pendulum is connected to an interconnection between an output of the first damper stage and an input of the second damper stage so that the centrifugal force pendulum is parallel to both damper stages (14, 15), wherein a limit stop for the first damper stage is provided on a disk part*

*connected to the centrifugal force pendulum, wherein in a closed state of the lock-up clutch (13) torque flows through the first damper stage and the second damper stage such that the centrifugal force pendulum acts on both damper stages (14, 15), and wherein in an open state of the lockup clutch, torque flows through only the second damper stage such that the centrifugal force pendulum acts only on the second damper stage.*

*45. The hydrodynamic torque converter according to claim 44, wherein the centrifugal force pendulum includes a mounting part connected to the interconnection between the first damper stage and the second damper stage and a plurality of absorber masses movably mounted on the mounting part.*

*46. The hydrodynamic torque converter according to claim 45, wherein the disk part forms the mounting part.*

*47. The hydrodynamic torque converter according to claim 44, wherein the centrifugal force pendulum includes masses and the multiple damper stages include energy accumulators, the masses extending radially outside of the energy accumulators.*

*48. The hydrodynamic torque converter according to claim 44, wherein a mounting part of the centrifugal force pendulum forms a single piece with the disk part (31).*

*49. The hydrodynamic torque converter according to claim 44, wherein the disk part is a unitary structure.*

* * * * *